(12) United States Patent
Skowaisa et al.

(10) Patent No.: US 7,826,992 B2
(45) Date of Patent: Nov. 2, 2010

(54) MEANS FOR CALIBRATING A MEASURING INSTRUMENT

(75) Inventors: Jürgen Skowaisa, Schiltach (DE); Wolfgang Perenthaler, Wolfach (DE); Holger Gotthelf, Alpirsbach (DE)

(73) Assignee: Vega Grieshaber KG, Wolfach (DE)

( * ) Notice: Subject to any disclaimer, the term of this patent is extended or adjusted under 35 U.S.C. 154(b) by 108 days.

(21) Appl. No.: 10/570,923

(22) PCT Filed: Oct. 7, 2003

(86) PCT No.: PCT/EP03/11083

§ 371 (c)(1),
(2), (4) Date: Dec. 4, 2006

(87) PCT Pub. No.: WO2004/034037

PCT Pub. Date: Apr. 22, 2004

(65) Prior Publication Data

US 2007/0199365 A1    Aug. 30, 2007

Related U.S. Application Data

(60) Provisional application No. 60/417,057, filed on Oct. 8, 2002.

(51) Int. Cl.
*G01C 25/00* (2006.01)
*G01L 25/00* (2006.01)

(52) U.S. Cl. .................... 702/104; 702/105; 702/106; 702/113

(58) Field of Classification Search ......... 702/104–107, 702/113–123; 701/33; 345/156; 73/1.01, 73/1.34, 1.58, 1.99
See application file for complete search history.

(56) References Cited

U.S. PATENT DOCUMENTS

| 4,748,861 | A | | 6/1988 | Matsumoto et al. | |
|---|---|---|---|---|---|
| 5,541,840 | A | * | 7/1996 | Gurne et al. | .................. 701/33 |
| 5,576,530 | A | * | 11/1996 | Hagerty | ................. 235/462.47 |
| 6,321,172 | B1 | | 11/2001 | Jakob et al. | |
| 6,370,020 | B1 | * | 4/2002 | Toukairin | .................... 361/681 |
| 2002/0193925 | A1 | * | 12/2002 | Funkhouser et al. | .......... 701/33 |
| 2004/0104889 | A1 | * | 6/2004 | Fehrenbach et al. | ......... 345/156 |

FOREIGN PATENT DOCUMENTS

| DE | 88 17 213 | 6/1994 |
|---|---|---|
| DE | 8817213 | 8/1994 |
| SU | 470670 | 5/1975 |
| SU | 955016 | 8/1982 |
| SU | 1339698 | 9/1987 |
| SU | 1562898 | 5/1990 |

* cited by examiner

*Primary Examiner*—Eliseo Ramos Feliciano
*Assistant Examiner*—Phuong Huynh
(74) *Attorney, Agent, or Firm*—Fay Kaplun & Marcin, LLP

(57) ABSTRACT

Described is a method and an output apparatus for inputting and outputting data from a first electronic device. The input and output apparatus is detachably mountable to the first electronic device and includes at least one storage unit, which stores data obtained by the first electronic device. Further discussed is an adjustment system which includes such an input and output apparatus and to the use of an input and output apparatus.

39 Claims, 7 Drawing Sheets

A-A

MEANS FOR CALIBRATING A MEASURING INSTRUMENT

PRIORITY CLAIM

This application claims the benefit of PCT Patent Application Serial No. PCT/EP2003/011083 filed on Oct. 7, 2003 which claims priority to U.S. Provisional Patent Application Ser. No. 60/417,057 filed on Oct. 8, 2002, the specifications of both applications are expressly incorporated herein, in their entirety, by reference.

TECHNICAL FIELD

The present invention relates generally to an input and output apparatus for inputting data or commands intended for an electronic device. In particular, the present invention relates to an input and output apparatus that is suitable to store data, in particular parameters and adjustment values, for adjusting a first electronic device in order to transfer those data to at least a second electronic device after the input and output apparatus has been mounted on the second electronic device. The invention also relates to an adjusting system having an input and output apparatus, a first and at least one second electronic device. Furthermore, the present invention relates to the use of an input and output apparatus for transferring data, in particular parameters and adjustment values between at least two electronic devices, as well as to a method for transferring data for adjustment between a first and at least one second electronic device.

Electronic devices in the sense of the present invention are for example all kinds of field devices or measuring apparatus. The measuring apparatus can be based on different measuring principles. An electronic device can therefore mean filling level measuring devices, pressure measuring devices, limit level detecting apparatus, temperature measuring apparatus, flow measuring apparatus, to quote just a few.

Filling level measuring devices could be TDR filling level measuring devices, radar filling level measuring devices and also ultrasonic filling level measuring devices.

Examples for limit level detectors are vibration limit level detectors and ultrasonic limit level sensors. Electronic devices based on the above measuring principles are sold under the trademarks VEGAPLUS, VEGASON, VEGAFLEX, VEGASWING, VEGABAR, VEGACAP.

Data in the sense of the present invention are items of information in the general sense, capable of being processed electronically. Adjustment values, however, are specific data suitable to adjust an electronic device. These may be items of information about the minimal or maximal possible filling level, information on the specific gravity of the filling matter, conversion values or commands for converting binary values into actual values representing the filling level, such as volume or distance units, or other information suitable to reflect specific framework conditions of a measuring spot, such as the storage of interfering echoes generated by vessel interior structures, for example a stirring apparatus.

BACKGROUND OF THE INVENTION

In order for the electronic devices to fulfil their measuring tasks, i.e. detecting and forwarding a measuring value, the electronic devices must be adapted to the requirements of each measuring spot at least once prior to first operation. It may, however, also become necessary for an already adjusted electronic device to be readapted to changing measuring conditions. Such adjustments are done in an adjustment process.

A filling level sensor, for example, must be supplied with information about the minimal and the maximal filling level in order to be able to correctly show a measuring value between these two values, or to transfer this value to a process control system. In a non contact measuring system, this may be achieved by communicating to the sensor manually via an input apparatus a maximal distance between the sensor and the filling matter surface at which the vessel is empty (0%) and a minimal distance between the sensor and the filling matter surface at which the vessel is full (100%). Under difficult measuring conditions it may also be necessary to set further parameters specific to the measuring spot. Thus, the sensor may be supplied, via the input apparatus, with geometric parameters specific to the vessel or the filling matter.

The same applies to filling level measurements with pressure measuring devices or capacitive measuring methods in which a complete filling and complete emptying of the vessel is also necessary for the setting process for sensor or device adjustment.

The, adjustment of devices for limit level detection working on the vibration principle is done by determining the vibrating frequency of the tuning fork of the device for limit level detection at the point where the tuning fork comes into contact with the filling medium, when the filling medium is filled into the vessel, and therefore deviates from its resonant frequency. For this adjustment the vessel must be made full, which in practice often requires a lot of effort and cost. Such adjustment processes are very expensive when there is a great number of identical measuring spots. There is therefore a need for rationalizing the adjustment of the individual electronic devices when there is a large number of identical measuring spots.

A great disadvantage is that when a sensor is exchanged, in case of repair, for example, the newly installed sensor must again be adjusted. There is therefore also a need for the adjustment values of an electronic device to be transferred to another electronic device.

SUMMARY OF THE INVENTION

At first it should be noted that the term input and output apparatus in the sense of the present invention may refer to various different functional apparatus. It may mean an apparatus only serving to input data or commands into the electronic device. Input and output apparatus can also mean an apparatus only serving as an output unit of data from the electronic device, i.e. for displaying data or general information from the electronic device to which it is attached. Input and output apparatus can also mean an apparatus allowing both inputting and outputting information or enabling the alternate operation for either process.

All the above-mentioned apparatus have in common that they may be detachably mounted on an electronic device. In should be noted, however, that the input and output apparatus are always exchangeable between electronic devices based on the same, or even different, measuring principles, such as pressure measurement, temperature measurement, filling level measurement using ultrasonic waves or microwaves, and capacitive filling level measurements and limit level detection. The electronic devices should be equipped with identically formed receiving means allowing an input and output apparatus of the present invention to be detachably mounted on a housing or the like of an electronic device. Mounting the input and output apparatus may also involve a contacting process so that an electrical connection is established between the device and the input and output apparatus.

According to a first aspect of the present invention, an input and output apparatus detachably mountable to an electronic device is provided for inputting and outputting data of said electronic device, wherein said input and output apparatus comprises at least one storage unit, in which the data or adjustment values obtained by said electronic device can be stored, wherein electronically erasable read/write memories may be used as said storage unit. The storage unit may also be selected from the group comprising RAM and EEPROM. Storing the corresponding data in the storage unit of the input and output apparatus is done by blocking the memory area taken up by the relevant data. If further data are to be stored in the storage unit, they must be stored in different memory areas. Suitable software is used for blocking and unblocking the storage areas.

According to this first aspect, the invention is particularly advantageous in that an apparatus is provided enabling, once adjustment values or parameter values have been established for adjusting an electronic device, these values to be copied in a simple and inexpensive way to a great number of identical electronic devices. When exchanging an electronic device, the existing adjustment values may also be transferred to the new electronic device.

A further advantage is that irrespective of the above-mentioned data transfer, the input and output apparatus of the present invention is capable of saving the data stored in it, at least temporarily, as may be the case with a technical fault or faulty operation.

According to a further aspect, the invention relates to an adjusting system for electronic devices, having an input and output apparatus and at least two electronic devices, wherein said input and output apparatus is detachably mountable on the first electronic device and has at least one storage unit, in which the adjustment values obtained by the first electronic device may be stored and from which said adjustment values may be copied to said second electronic device, after the input and output apparatus has been mounted on the second electronic device. The adjustment data obtained by the first electronic device may be copied by an operational instruction via the keyboard of the input and output apparatus or, alternatively, may be automatically copied by the first electronic device to the storage unit of the input and output apparatus after an adjustment process is completed.

The adjustment system is particularly advantageous in that the input and output apparatus may be taken off the first electronic device and mounted on the second electronic device, in order to supply the second electronic device with the adjustment values stored in the storage unit by means of a further operating instruction.

Alternatively, the adjustment values may be copied automatically from the storage unit of the input and output apparatus into the second electronic device as soon as the input and output apparatus has been mounted on the second electronic device. The special design of the input and output apparatus is also particularly conducive to transferring data, in particular by the design of the contacting means and the provision of operating keys, as is described in more details below.

A further aspect of the present invention relates to the use of an input and output apparatus for inputting and outputting data in order to transfer data, in particular parameters and adjustment values, between a first and at least one second electronic device, wherein said input and output apparatus is detachably mountable on first and second electronic devices, and has at least one storage unit, in which data obtained by said first electronic device are stored, from where said data may be copied to the second electronic device.

By this use of an input and output apparatus according to the invention it is possible for the first time to exchange data, in particular parameters and adjustment values, between two electronic devices in a simple way so that for the second electronic device, which must be at a measuring spot of the same kind as the first electronic device, a separate adjustment for adjusting the electronic device is no longer necessary.

According to yet another aspect of the present invention, a method is proposed suitable for transferring data, in particular parameters and adjustment values for adjustments, between a first and at least one second electronic device, the method having the following steps: a) determining adjustment values for adjusting said first electronic device and storing said adjustment values in said first electronic device, b) copying said adjustment values for adjusting said first electronic device into a storage unit of an input and output apparatus mounted on said first electronic device, c) detaching said input and output apparatus from said first electronic device and mounting said input and output apparatus on said at least one second electronic device; and d) copying said adjustment values for adjusting said first electronic device into said second electronic device.

In this method it is possible for the adjustment values of the first electronic device to be copied into the storage unit of the input and output apparatus after inputting an operating command via the input and output apparatus. Alternatively, however, it is possible to automatically copy the adjustment values for adjusting the first electronic device into the storage unit of the input and output apparatus after completing each adjustment process. These two possibilities for copying the adjustment values for adjusting the first electronic device into the storage unit of the input and output apparatus may also be applied to copying the adjustment values for adjusting the second electronic device from the storage unit of the input and output apparatus into the second electronic device. It is thus possible to copy the adjustment values for adjusting from the storage unit of the input and output apparatus into the second electronic device by means of inputting an operating instruction to be input via the input and output apparatus. Alternatively, it is possible for the adjustment values for adjusting to be automatically copied from the storage unit of the input and output apparatus into the second electronic device as soon as the input and output apparatus has been mounted on the second electronic device.

An exemplary embodiment of an input and output apparatus according to the present invention is detachably mounted on an electronic device. This detachable mounting may be used to advantage, when the input and output apparatus has been complemented by the storage unit, by removing the input and output apparatus from said first electronic device in order to mount it at least on one second electronic device. If said second electronic device is a measuring device operating on the same measuring principle and if the remaining framework conditions of the measuring spot are the same as with the first measuring spot, the adjustment values stored in the storage unit may be used to adjust the second electronic device. This transfer of data may be done by copying the adjustment values into the electronics unit of the second electronic device by means of an operating instruction, which may be inputted by the keys of the input and output apparatus, while the data remain stored in the input and output apparatus for data saving purposes. In this way, an adjustment process, once completed, can be used for any number of measuring spots of the same kind, considerably reducing the overhead normally encountered when all the vessels must be filled and emptied.

According to a further exemplary embodiment of the present invention, the input and output device is designed for being detachably mounted to the electronic equipment in at least two different positions, and has a first contacting means that, independent of the selected position in the mounted state of the input and output device on the electronic equipment, electrically comes into contact with a second contacting means that is present on the electronic device.

All of the above-mentioned devices have in common that they are detachably mountable to an electronic equipment. In particular, it is also devised to provide electronic equipment of different designs and that is in particular even based on various measurement principles—such as pressure measurement, temperature measurement, filling level measurement on the basis of ultrasonic waves or microwaves, as well as filling level measurement and also, for example, limit state detection and flow measurement—with an always identically designed reception means that permits an input and output device according to the invention to be mounted.

According to a further aspect, an input and output device for inputting data and/or for displaying information of an electronic equipment is introduced, that comprises an attachment means for detachably mounting the input and output device to the electronic equipment, and a first contacting means that, in the mounted state of the input and output device on the electronic equipment, electrically comes into contact with a second contacting means present on the electronic equipment. The attachment means here may either be designed in such a manner that it only permits a single position for mounting the input and output device to the electronic equipment or that more than one position may be adopted. It is possible that the input and output device is also designed in such a manner that it may adopt any desired position on a circle, for which purpose the attachment means then may permit a rotational movement.

In a further exemplary embodiment of an input and output device according to the invention, the first contacting means comprises plural groups of contacting means, and the groups of contacting means are arranged spaced apart from each other. One advantage of such an arrangement may be that only one second contacting means needs to be present on the electronic device, which, depending on the selected position, electrically comes into contact with one of the groups of contacting means on the input and output device in the mounted state of the input and output device. Of course, it is also possible that the second contacting means present on the electronic equipment comprises plural groups of contacting means, and that only one contacting means is present on the input and output device. Also in this embodiment, it is guaranteed, independent of the selected position, that always a first contacting means and a second contacting means come into electric contact with each other.

A first contacting means may comprise at least one electric contact surface, and a second contacting means may comprise at least one electric spring contact, that comes into contact with the electric contact surface. Of course, it is also possible that the first contacting means is designed as an electric spring contact, and the second contacting means comprises at least one electric contact surface. Even other detachable contact connections known per se in the art, may be used in an exemplary embodiment of the present invention.

According to an exemplary embodiment of an input and output device according to the present invention, a first attachment means is present on the input and output device, which, in the mounted state of the device, detachably comes into engagement with a second attachment means provided on the electronic equipment. This design enables the input and output device to be fixed to the electronic equipment, preferably in the position selected each time.

A further exemplary embodiment of an input and output device according to the present invention provides that the first attachment means and the second attachment means together form a bayonet joint. Hereby, a secure and reliable attachment of an input and output device to an electronic equipment is ensured by a slight axial and rotational movement about a certain angle area, the connection, however, may be detached again. Moreover, it is also possible in such a design that the input and output device may be attached on the electronic equipment in a constructionally simple manner in various postures or positions or is fixed to the electronic equipment in any selected position.

In particular, in one exemplary embodiment of an input and output device according to the present invention, the first attachment means comprises at least one pivot, and the second attachment means comprises at least one pivot receiving recess, into which a pivot may be introduced, e.g. by means of a combined axial and rotational movement. The number of pivots and pivot receiving recesses allows the number of selectable positions for mounting the input and output device to the electronic equipment to be determined. In particular, it is appropriate, when at least two pivots are provided engaging into four recesses for receiving the pivots, so that at least two different positions may be adopted, in particular four different positions may be adopted, each of which turned by 90°.

In order to avoid an unintentional detachment of the input and output device, at least one of the pivot receiving recesses, in a further exemplary embodiment of an input and output device according to the present invention, is provided with a blocking means. This blocking means is in particular formed as an elevation that is placed in the pivot receiving recess and that needs to be passed by the pivot with blocking of the first and second attachment means.

One exemplary embodiment of an input and output device according to the present invention has an upper side and a lower side. The upper side faces the user and comprises at least one operating means and/or one display means. The operating and/or display means are in connection with the first contacting means. The first contacting means is present on the lower side and has contacting surfaces or contacting springs placed in various locations on the lower side, whereby a connection of the second contacting means is ensured in any possible position of attachment. As has already been mentioned before, it is in particular advantageous to provide two or three or four or five groups of contacting surfaces evenly spaced apart from each other on a circle, so that, depending on the number of groups of contacting means, the input and output device may adopt positions on the electronic equipment differing by 90°, 60° or 45°.

In a further exemplary embodiment of an input and output device according to the present invention, the input and output device comprises a device body, which in turn is provided on the lower side of a reception ring, which may be inserted in or slipped on a corresponding reception ring on the electronic equipment.

A further exemplary embodiment of an input and output device according to the present invention comprises at least one operating key and/or at least one display means.

The display means in particular is in connection with the first contacting means so as to be supplied by the electronic equipment with electric current for the display means and for displaying data of the electronic equipment.

According to a further aspect of the present invention, an input and output device comprises an attachment means for detachably mounting the input and output device to the electronic equipment, and a first contacting means that, in the mounted state of the input and output device on the electronic equipment, electrically comes into contact with a second contacting means present on the electronic equipment. Such an input and output device needs not forcibly but may be designed such that it may be mounted to the electronic equipment in at least two different positions. Here, the essence of the invention is that the input and output device may be mounted detachably.

As has already been explained before, in an exemplary embodiment of the present invention, the first attachment means and the second attachment means is designed as a bayonet joint. The input device may, for example, be selected from the group of input devices comprised of press button, switch, touch screen, key, roll, rocker switch and joystick. It is also possible to combine various input devices with each other.

An exemplary embodiment of the present invention may be realized as an operating and display module for operating an electronic equipment. The module is designed for being detachably mounted to an electronic equipment in at least two different positions and comprising for this purpose at least one means of the group of means comprised of an input device and an output device, a first attachment means, that may be detachably engaged in each selected mounting position to the electronic equipment with a second attachment means present on the electronic equipment, and a first contacting means that contacts in the mounted state of the operating module on the electronic equipment, a second contacting means that is part of the electronic equipment so as to transmit electric signals to the electronic equipment corresponding to the inputs/outputs. The input device and the output device comprises at least one storage unit, in which the data or adjustment values of the first electronic equipment can be stored and/or transferred to a second electronic equipment.

In particular, in one exemplary embodiment of an operating and display module according to the present invention, the module is designed essentially cylindrical and fits into a cylindrical reception of the electronic equipment.

Furthermore, the invention refers to a combination of an input and output device for inputting data and/or for displaying information of an electronic equipment, and at least two electronic equipments, e.g. filling level devices. The input and output device of such a combination is designed for being detachably mounted to the electronic equipment in at least two different positions and comprises a first contacting means that, independent of the selected position in the mounted state of the input and output device on the electronic equipment, electrically comes into connection with a second contacting means present on the electronic equipment. The input device and the output device comprises at least one storage unit, in which the data or adjustment values of the first electronic equipment can be stored and/or transferred to a second electronic equipment.

In an exemplary embodiment of a combination according to the present invention, the attachment means for fixing the input and output device to the electronic equipment is a separate cover member. In one exemplary embodiment of a combination according to the present invention, the cover member has an internal thread, and the electronic equipment has an external thread, whereby the latter may be screwed on the internal thread.

In a further exemplary embodiment of a combination according to the present invention, the reception means is designed for detachably mounting an input and output device in at least two different positions.

In an exemplary embodiment of a combination according to the present invention, the contacting means comprises at least one contact spring.

In conclusion, it has to be noted that single features of a device according to the invention such as the above-explained input and output device, the operating and display module, the electronic equipment, the combination, each may also be realized in the others.

BRIEF DESCRIPTION OF THE DRAWINGS

For further explanation and better comprehension, an exemplary embodiment of the present invention will be described in more detail with reference to the accompanying drawings, in which.

Figure 1:
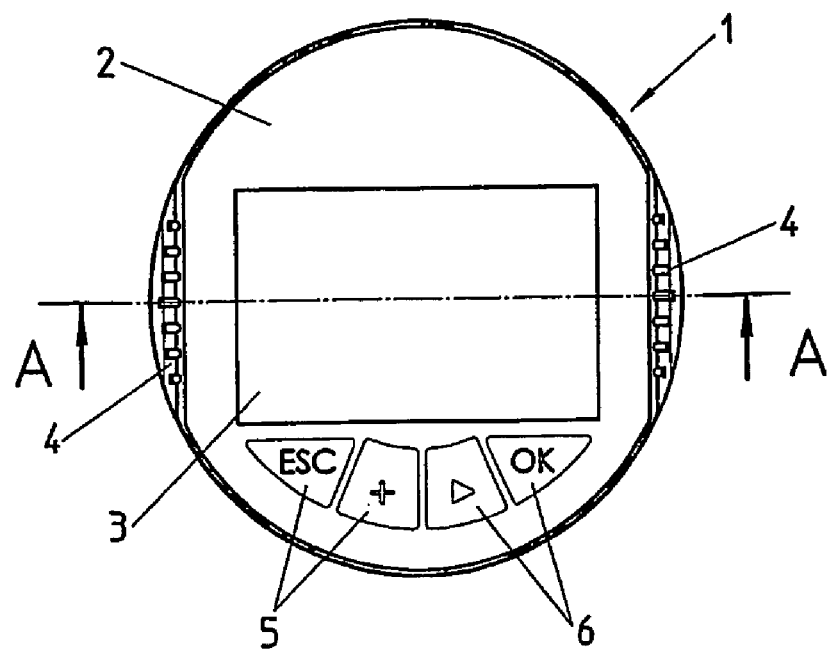
FIG. 1 is a top view of an input and output apparatus according to the invention.

In the top view of an input and output apparatus 1 of the present invention, a top side 2 of the input and output apparatus 1 with display means 3 and operating keys 5, 6 can be seen. Input and output apparatus 1 has an essentially cylindrical body with two gripping recesses 4 in a top part thereof. Gripping recesses 4 are opposite to each other and enable improved handling of the input and output apparatus 1, in particular, for rotating the same.

In the exemplary embodiment shown, display means 3 is an LCD display, centered on the top side 2 of input and output apparatus 1. Operating keys 5, 6 are placed on a longitudinal side of display means 3. Operating keys 5, 6 are for operating and/or configuring by menu control the electronic device to be coupled with the input and output apparatus. Of course, more or fewer keys 5, 6 may also be attached on an input and output apparatus 1 of the present invention. Moreover, it would also be possible to provide other switches and/or keys or controls on the longitudinal side of display means 3.

Figure 2:
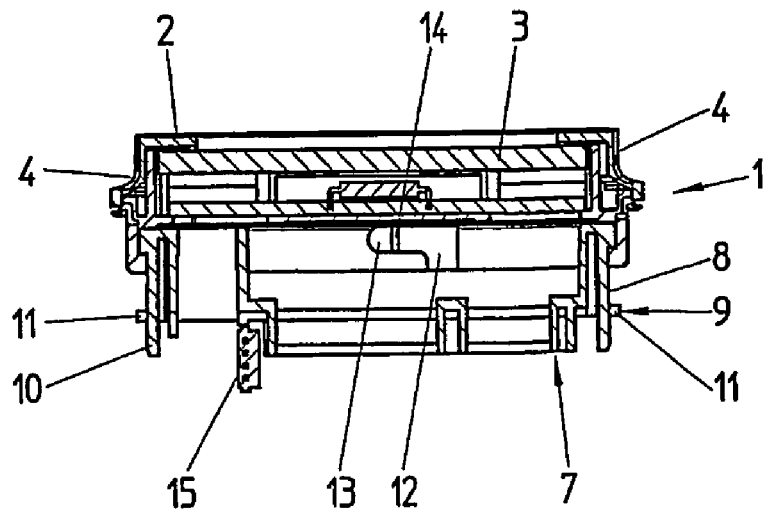
FIG. 2 is a sectional view of the input and output apparatus of FIG. 1 taken along line A-A.

FIG. 2 shows a sectional view taken along line A-A of FIG. 1. As can be seen, input and output apparatus 1 is mounted on a receiving unit 8 which is usually securely attached to an electronic device (not shown). Receiving unit 8 is secured to the electronic device by means of snap protrusions 11 in particular. Thus, receiving unit 8 has its underside 7 secured to the top of an electronic device (not shown). It has an electrical connection means 15 linked to the electronic unit of an electronic device (not shown). This electrical connection means 15 is connected to a contacting means of the electronic device.

Further, a plunger receiving recess 12 can be seen from the figure into which a plunger (not shown) will be inserted. The plunger receiving recess has a locking bump 14 in its rear portion limiting a portion 13 of the plunger receiving recess. For a more detailed design of this connection means, reference is made to the explanations of FIG. 4-10 below.

FIG. 2 illustrates a storage unit 50 for intermediary storage of the adjustment values determined by a first electronic device and serving to adjust the same, so that the adjustment values may be transferred to a second electronic device. An electronically erasable read/write memory may be used as a storage unit. However, other storage units may also be selected from the group comprising RAM, ROM, PROM, EPROM and EEPROM.

Storage unit 50 is connected to an electronics unit of the electronic device via electrical connection means 15. When copying the adjustment values of the electronic device into storage unit 50 it is also possible to copy the adjustment values into storage unit 50 automatically after completion of each adjustment process.

Alternatively, it is possible for the adjustment values not to be copied from the electronic device via electrical connection means 15 into storage unit 50 until an instruction to copy the adjustment values into storage element 50 has been entered via operating keys 5, 6.

Figure 3:
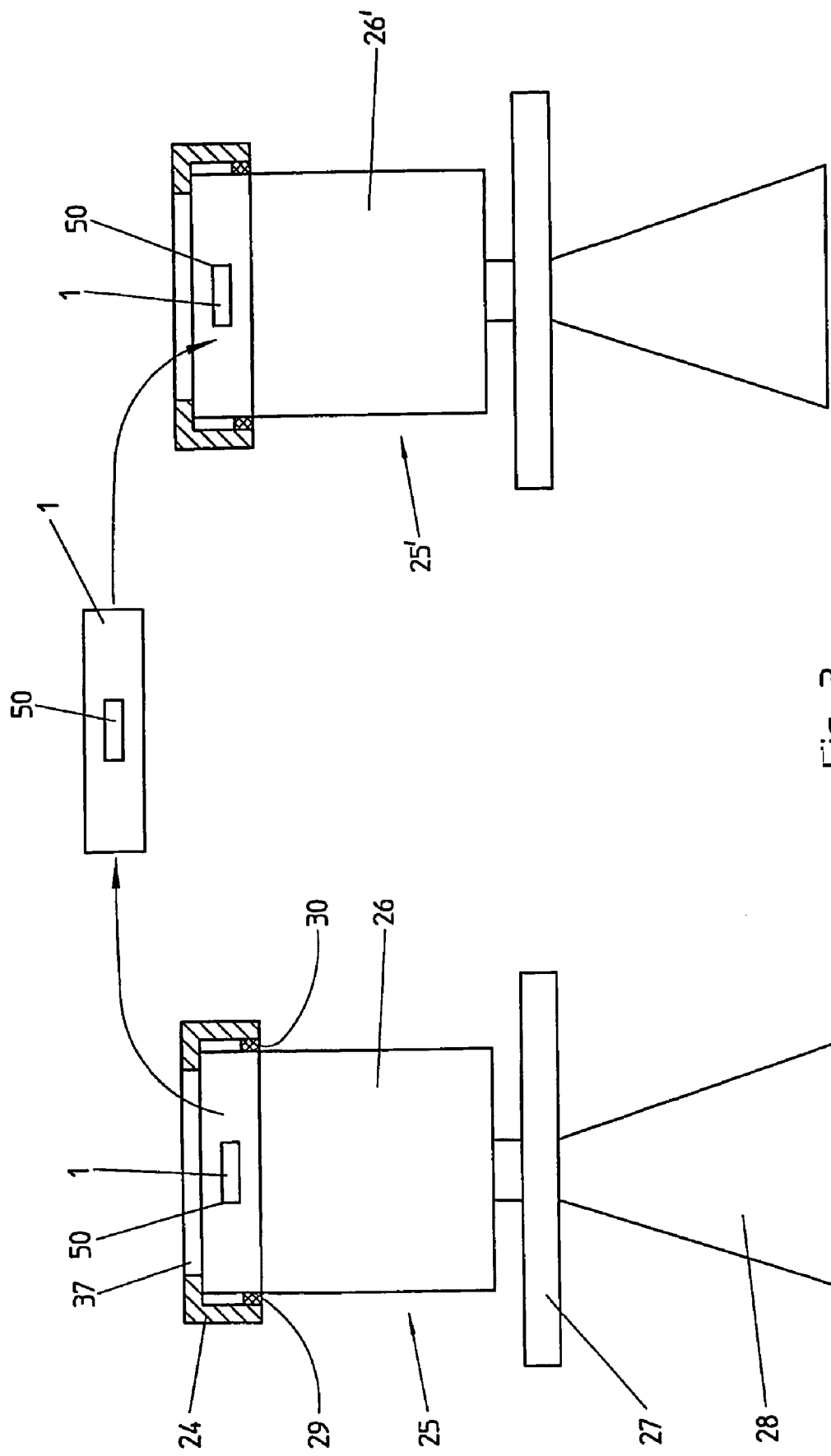
FIG. 3 is a schematic elevational view with portions cut away of a first electronic device and a second electronic device, wherein the exchange of the input and output apparatus of the present invention between the two electronic devices is shown with arrows.

In the schematic, partially but-away view in FIG. 3, an electronic device 25 is shown with an input and output apparatus 1 mounted on it. In this case, electronic device 25 is a filling level radar comprising an electronics unit 26 with a housing, a mounting flange 27 and a horn antenna 28. On the top of housing 26, an exterior thread 29 is screwed into an interior thread 30 of a cap member 24. Cap member 24 has an opening 37 so that display means 3—shown in phantom—of input and output apparatus 1 are visible to a viewer. Operating keys 5, 6 of the input and output apparatus 1 are of course also accessible to an operator. As can be seen in FIG. 3, after mounting input and output apparatus 1 on electronic device 25, input and output apparatus 1 is secured by means of cap member 24.

As can be seen from FIG. 3, input and output apparatus 1 can be removed from the first electronic device 25 after cap member 24 has been screwed off first electronic device 25—indicated by an arrow pointing upwards—and may then be mounted on second electronic device 25', also a filling level radar in the present example—indicated by the arrow pointing downwards—and subsequently secured by cap 24'.

The adjustment values previously stored by electronic device 25 in storage unit 50 of input and output apparatus 1 may then be copied to electronics unit 26' of the second electronic device as soon as input and output apparatus 1 has been mounted on the second electronic device 25'.

Said transfer of adjustment values for adjusting the second electronic device is possible either by an operator actively inputting an operating instruction via keys 5, 6, instructing the adjustment values to be copied from storage unit 50 into electronics unit 26' or, alternatively, by automatically transferring the adjustment values from storage unit 50 into electronics unit 26' of second electronic device 25' as soon as input and output apparatus 1 has been mounted on the second electronic device 25'.

Under certain circumstances data of a sensor may also be saved in a display and operating module separate from the sensor, i.e. the module would not be detachably mounted on the sensor, but would be linked to the sensor via a data line.

From the top view of an input and output device 1 according to the present invention, the upper side 2 of the input and output device 1 with the therein contained display means 3 and operating keys 5, 6 can be clearly seen. The input and output device 1 has an essentially cylindrical body that shows two handle recesses 4. The handle recesses 4 are situated opposite each other and serve for a better handling of the input and output device 1, in particular for turning same.

In the exemplary embodiment shown here, the display means 3 is an LCD display placed in the center of the upper side 2 of the input and output device 1. On one longitudinal side of the display device 3, there are operating keys 5 6. These operating keys 5, 6 serve the purpose of operating or configuring under menu control the electronic equipment to be connected to the input and output device, which electronic equipment will be described in detail in the following. Of course, even less or more keys 5, 6 may be mounted to an input and output device 1 according to the invention. Furthermore, it would of course also be possible to provide, for example, on the other longitudinal side of the display means 3 further switches and keys or operating members, respectively.

FIG. 2 shows a section along line A-A of FIG. 1. As can be seen, the input and output device 1 here is already mounted to a reception part 8 that is normally firmly connected to an electronic equipment not shown here. The reception part 8 here is attached to the electronic equipment by means of attachment means 9, in particular locking projections 11. Thus, the reception part 8 rests with its lower side 7 on the upper side of the electronic equipment. It features an electric plug connection 15 connected to the electronic unit of an electronic equipment not shown here. This electric plug connection 15 is in connection with an electric contacting means of the electronic equipment, which will be explained below.

In particular, a pivot receiving recess 12 can be recognized in FIG. 2, into which a pivot not shown here may be introduced. In its rear part, the pivot receiving recess has a blocking elevation 14 delimiting a part 13 of the pivot receiving recess. The specific configuration of this attachment means will be explained in more detail with reference to FIG. 5.

Further details of the input and output device 1 according to the invention can be seen in the view from below according to FIG. 4. As can be very well recognized, the input and output device 1 has a cylindrical body and accordingly a ring member 10, in which the pivot receiving recesses 12 end on the front side visible here. These openings of the pivot receiving recesses 12 are indicated with reference numeral 20.

Figure 4:
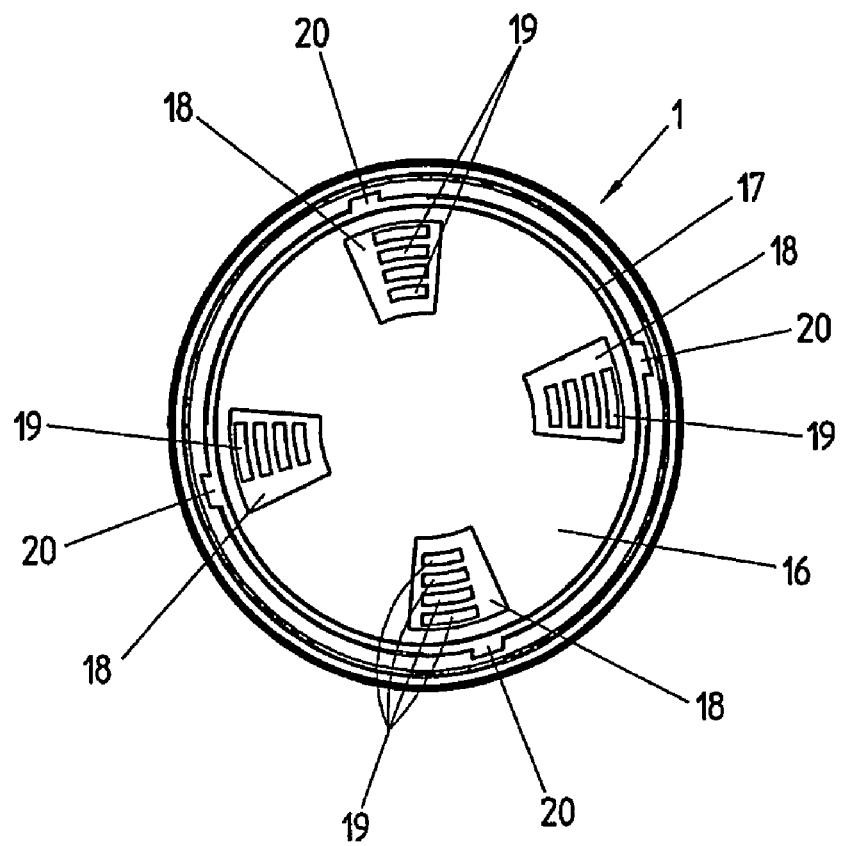
FIG. 4 a view from below of the input and output device shown in FIG. 1.

In total, four pivot receiving recesses 12 are present in the exemplary embodiment of an input and output device 1 shown in FIG. 4, each offset by 90°, which end in corresponding recesses or openings 20 on the front side of ring member 10.

Figure 5:
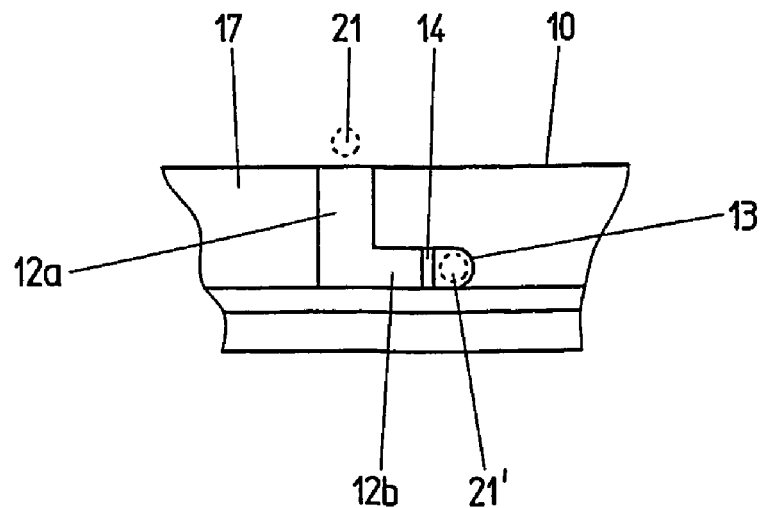
FIG. 5 a detail of the inner side of a ring member of the input and output device shown in FIGS. 1 through 4.

The ring member 10 hence features pivot receiving recesses 12 on the inner side 17 each shown in FIG. 5. The ring member 10 itself, as will be explained below, will be inserted in a corresponding tube or cylinder piece that is connected to the electronic equipment.

In the mounted state of the device, the lower side 16 of the input and output device is facing the electronic equipment. Here, four circle ring segment sections 18 are present, in each of which several contact surfaces 19 are grouped. Each group of contact surfaces 19 has the shape of a ring segment. These contact surfaces 19 are connected to the operating keys 5, 6 or the display means 3 via a line not shown here.

Figure 6:
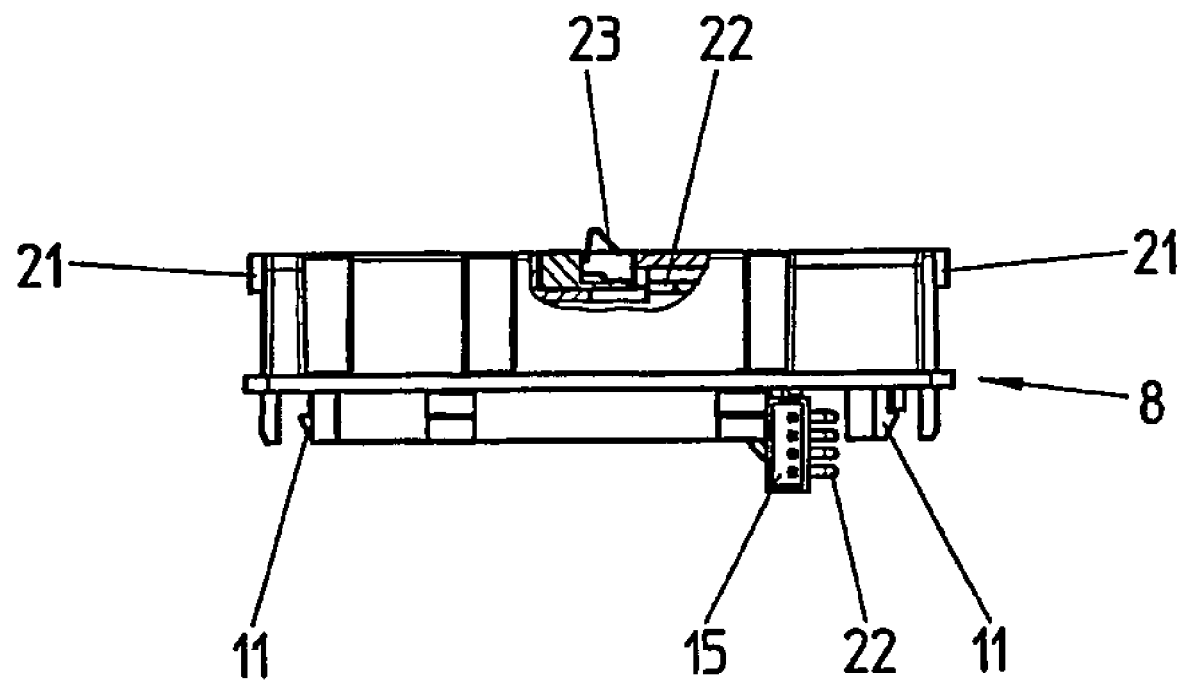
FIG. 6 a schematic sectional view of a reception part that may be attached to an electronic equipment by a snap-on catch and that serves for receiving an input and output device according to the preceding Figures.

They serve for establishing a contact with the second contacting means 23 present on the electronic device which are explained in more detail in FIG. 6. In the exemplary embodiment shown in FIG. 4, four groups of contacting means, hence the contact surfaces 19, are present so as to allow that the input and output device 1 can be mounted in four different positions on the electronic equipment and that in each selected position a contact may be established with the second contacting means 23 of the electronic equipment.

The reception part 8 of the electronic equipment is shown in FIG. 6 in a schematic partial section. As can be seen, the reception part 8 is provided with several pivots on the upper side, i.e. with at least three pivots, that have to be introduced into the pivot receiving recesses 12 or their associated openings 20. On the opposite side, several locking projections 11 are present that may be firmly hooked in a corresponding counterpart on the electronic device so that the reception part 8 and the electronic equipment are firmly connected to each other. The reception part 8 has the form of a tube, to the outside of which the pivots 21 are mounted so that the outside may be put onto the inside 17 of the input and output device 1 and may be secured by an axial and rotational movement, as it is usual for bayonet joints, in the desired position of the input and output device 1 on the reception part 8.

In a schematic view in FIG. 6, the second contacting means 23, as well, is shown in the form of one or more contact springs 23 connected to an electric line 22 by means of the electric plug connection 15 already explained above. The electric plug connection 15 may then in turn be connected to the electronic equipment.

The electric contact springs 23 in the representation shown in FIG. 6 are bent from the horizontal in order to ensure a contact with the respective contact surfaces 19 of the input and output device in the state placed on the electronic equipment even with a different spacing of the contact surfaces from the contact spring. When the input and output device 1 according to FIGS. 1 through 4, and the reception part 8 of the electronic equipment, not shown here, are connected, then only one group of contact springs 23 need to be present that make contact with a group of contact surfaces 19.

Of course, it is also possible that several groups of contact springs 23 are present on the reception part 8, and only one group of contact surfaces 19 is provided on the input and output device 1.

Figure 7:
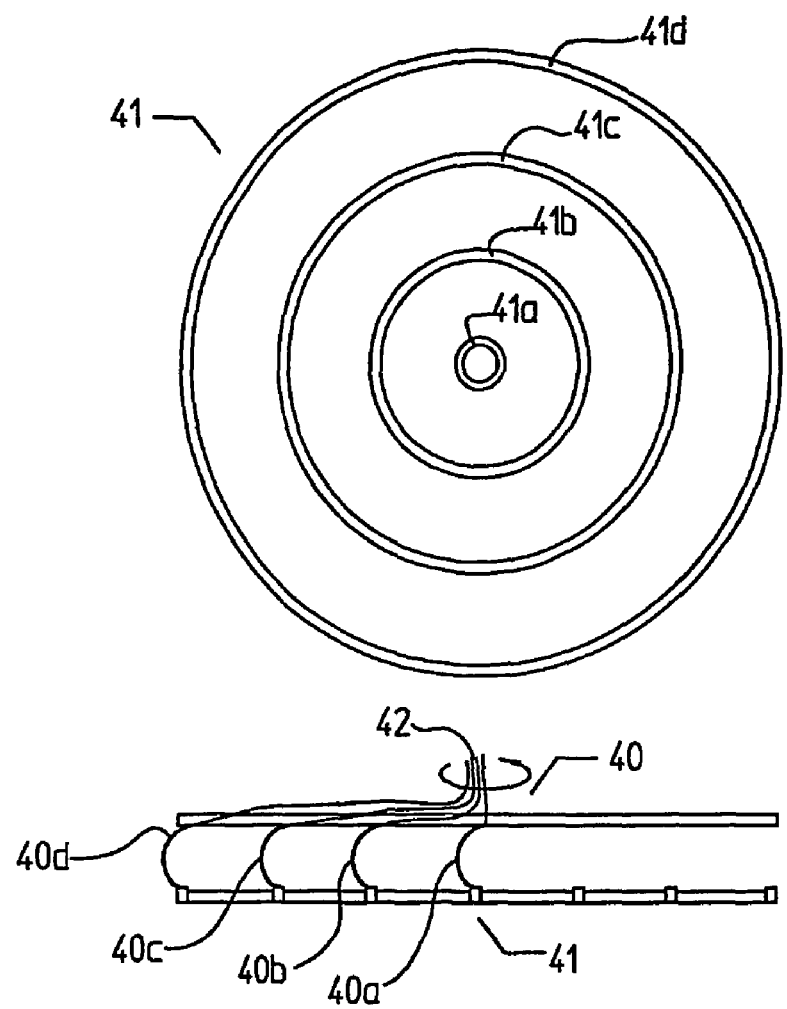
FIG. 7 a schematic top and cross-sectional view of first and second contacting means according to an exemplary embodiment of the invention.

From the top or sectional views according to FIG. 7, a further exemplary embodiment of the present invention can be seen having a first contacting means 40 and a second contacting means 41. The first contacting means 40 comprises several radially spaced contact springs 40a, 40b, 40c, 40d connected to the associated electric or electronic means of the display and operating module via lines 42. Hence, it can be noted that the first contacting means 40a-40d are mounted to the display and operating module.

The second contacting means comprises annular conductor tracks 41a, 41b, 41c, 41d arranged concentrically to each other. The conductor tracks 41a-41d are part of an electronic equipment intended for being detachably connectable to an input and output device comprising the first contacting means 40a-40d. As can be seen from the representation according to FIG. 7, the contacting springs 40a-40d are arranged so as to contact the individual conductor tracks 41a-41d when the display and operating module is in the placed state. Due to the concentric configuration, the establishment of a contact is guaranteed in any desired rotational position of the display and operating module. This easily allows the display and operating module to be operated on the electronic equipment in such a manner that a user or observer may in each case adjust the position that is most appropriate to him.

Figure 8:
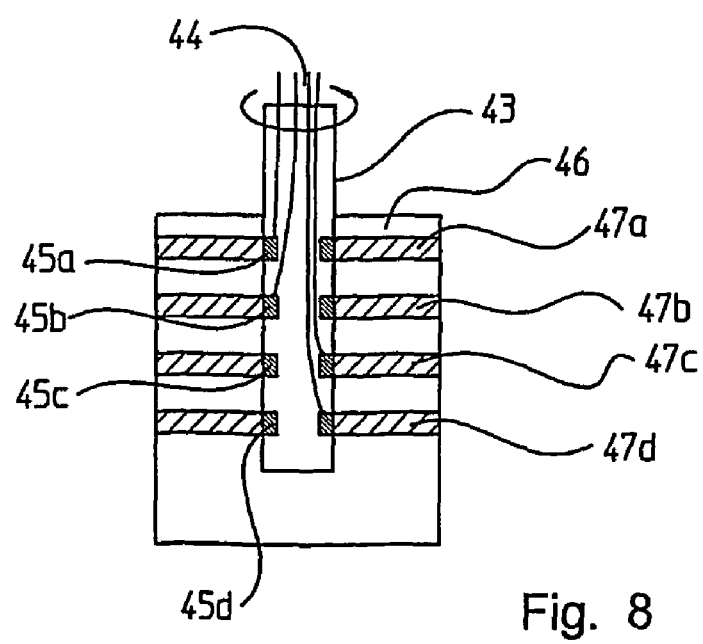
FIG. 8 a schematic cross-sectional view of first and second contacting means according to a further exemplary embodiment of the invention.

Still another exemplary embodiment of the present invention having a first contacting means and a second contacting means is shown in the schematic representation according to FIG. 8. Here, the first contacting means comprises a pivot 43 featuring slip rings 45a, 45b, 45c and 45d at various heights on the outer periphery. These slip rings 45a-45d each are connected to lines 44 leading to the individual electric or electronic means of a display and operating module.

An electronic equipment to be connected to a corresponding display and operating module has a reception bore 46, on the inner circumference of which single contacting rings 47a, 47b, 47c and 47d are arranged at various heights. By introducing the pivot 43 into the reception bore 46, the first contacting means 45a-45d come in electrical contact with the second contacting means 47a-47d. Due to the pivot configuration, a rotation of the pivot 43 in the reception bore 46 is possible while an electric contacting between the first and second contacting means is maintained. Therewith, the same effect is achieved as with the exemplary embodiment according to FIG. 7.

Figure 9:
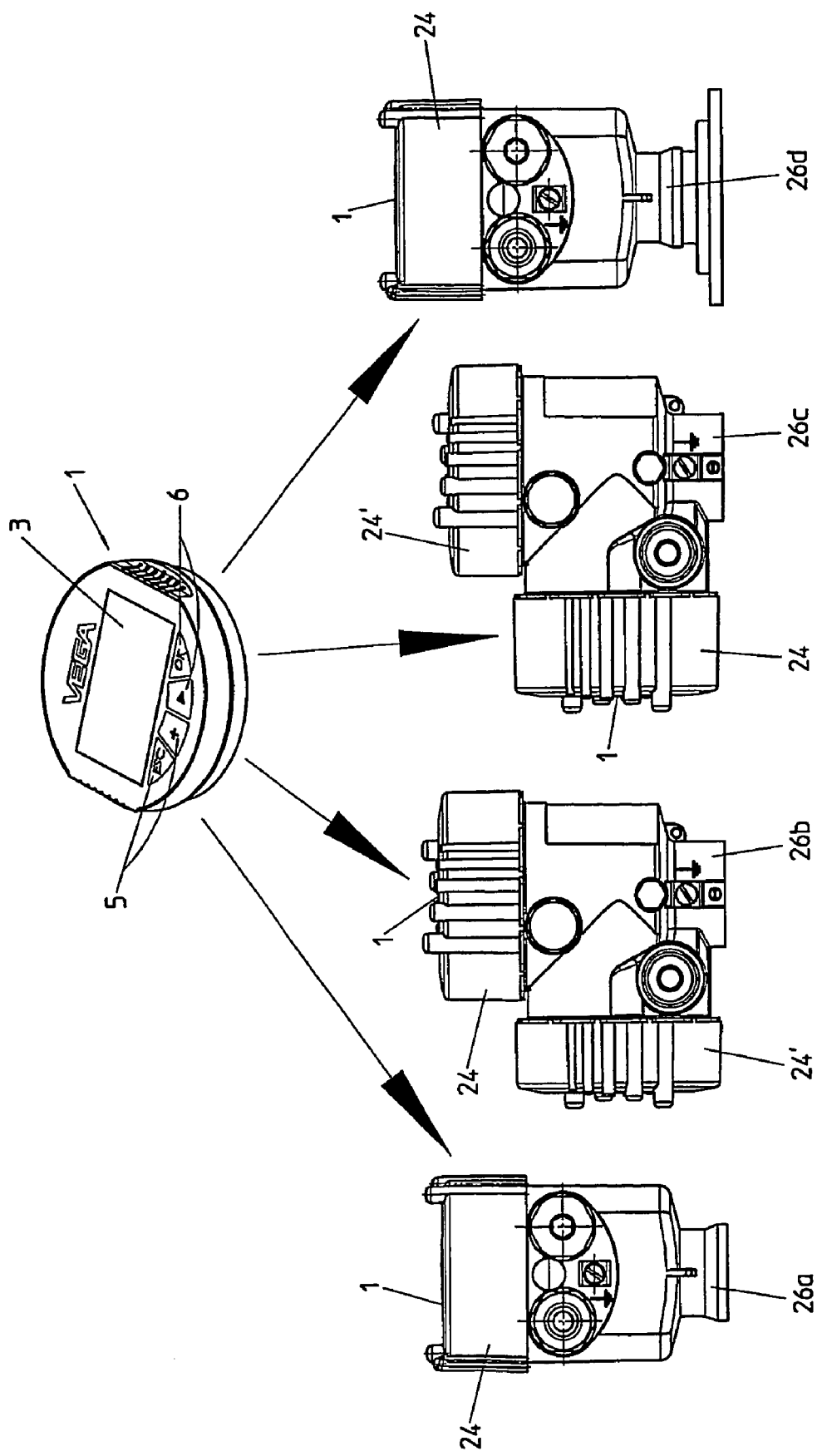
FIG. 9 a schematic representation of housings in which an input and output device or a display and operating module may be mounted, and FIG. 10 a representation of various electronic equipment sets according to the invention, which may be used with an input and output device according to the invention.

FIG. 9 schematically shows the various kinds of use of a single input and output device 1 such as it has been described above, on various housings 26a-26d. The housing 26a of an electronic equipment, for example, is a single-chamber housing that may be used for most diverse kinds of electronic equipment explained in more detail in FIG. 10.

An input and output device 1 may be mounted to this housing 26a and may be screwed by means of the cover 24.

Housing 26b is a dual-chamber housing featuring two possibilities for mounting the input and output device 1, in one case on the top, in the other on the side. In each case, a cover 24 or 24' may be screwed on (this cover differs from cover 24 in that it does not feature a break-through opening).

On housing 26c, the different mounting of the input and output device 1 is visible. A further housing design 26d is shown on the right side in FIG. 9. Here, the input and output device 1 only serves for displaying. Operating activities are not intended to be possible, therefore, the operating keys 6, 7 may be omitted in the input and output device.

In conclusion, it has to be noted that the input and output device 1 may be mounted to various housings designed for accommodating the input and output device 1, and may be used accordingly as an operating and display module; and this, incidentally, independent of the measurement principle on which the electronic equipment is based. Moreover, the housings 26a-26d may be made of various materials. This, depending on the purpose of application, e.g. a plastic housing, a V4A housing or an aluminum housing may be concerned.

The electronic equipment that can be used with such a housing and an input and output device 1 according to the invention are represented in FIG. 1 in an manner.

Figure 10:
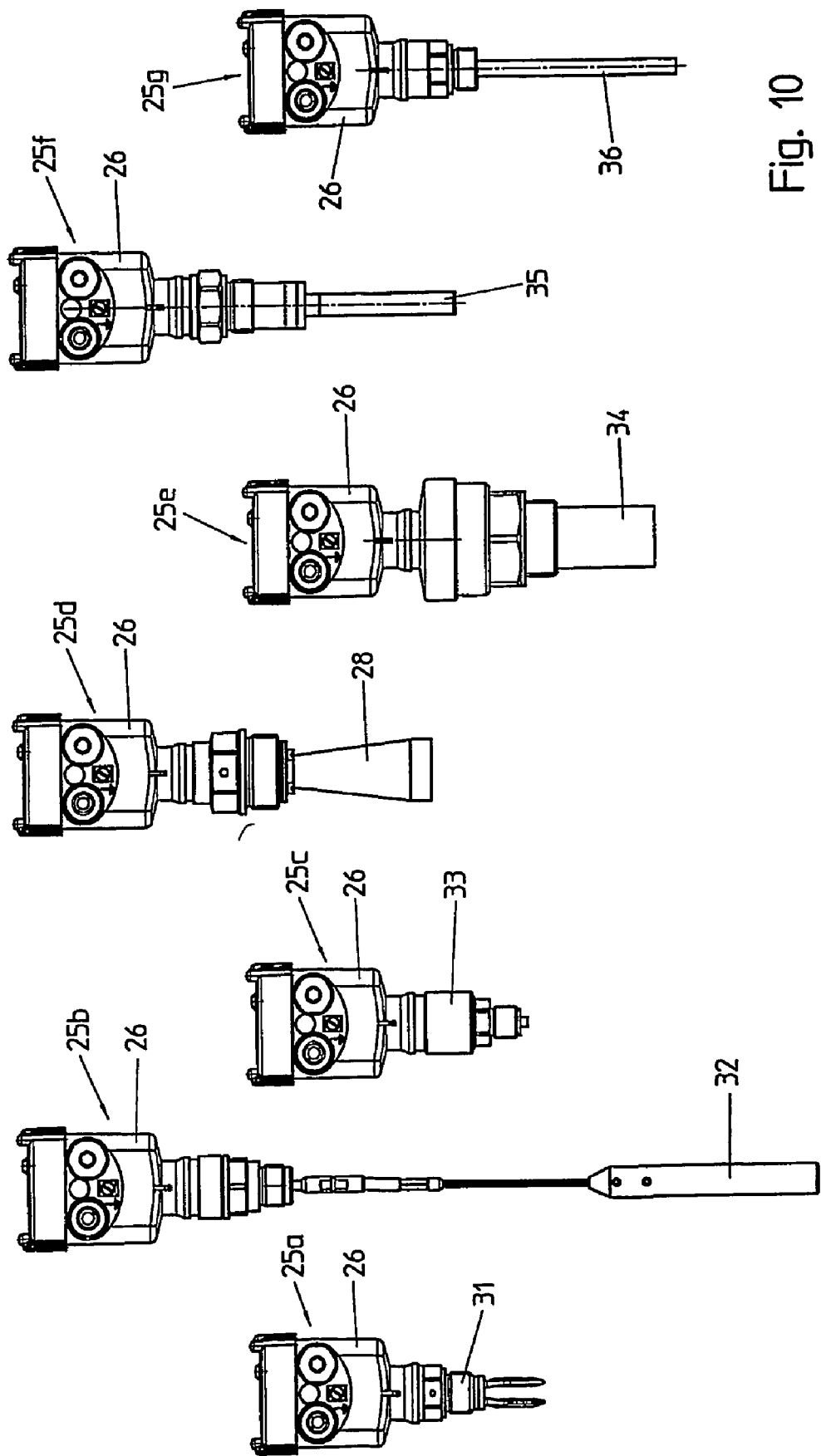

Thus, in FIG. 10, on the very left, there is shown a measurement device comprising a swing fork 31 as a sensor. This measurement device is available under the designation "VEGASWING". Here, it is provided with a housing according to the invention including a reception part and a mountable input and output device 1.

Furthermore, a cover 24 may be screwed on.

The second electronic equipment from the left is a TDR filling level sensor 25b featuring a carrying part 32 from which a microwave is emitted in a guided manner and reflected echoes return to the device. This electronic equipment 25b, as well, has a housing 26 for accommodating an input and output device 1 including a cover 24.

The electronic equipment 25c shown at the right side of the aforementioned electronic equipment 25b is a pressure sensor which likewise features again an identical housing 26 for mounting an input and output device 1 and a cover member 24.

At the right side of the pressure sensor 25c, a filling level radar sensor 25d is shown featuring a horn antenna 28. The housing 26 again is designed in the manner described before. At the right side of the filling level radar 25d, a further filling level radar 25e is shown, in this case equipped with another antenna 34 (fully covered antenna). The housing 26 is designed as it is the case with the filling level radar 25d.

Further to the right, a limit state detection sensor 25f is shown featuring a swing rod 35. Again, the sensor has a housing 26 of the construction described before including a cover member 24, with the initially described input and output device 1 being mountable to the housing 26.

Finally, at the very right of FIG. 10, a capacitive filling level indicator 25g is shown featuring an electronic rod 36. Again, this filling level sensor is equipped with a housing 26 of the design described before.

Thus, it can be clearly recognized that all of the different measurement principles and the corresponding sensors may be equipped with the same input and output device 1, for which purpose these housings are of the same design. Therewith, a simple and modular exchange of an input and output device 1 on various sensors is possible. At the same time, it is rendered possible that a user always is faced with the same operation due to the input and output device 1, independent of the present sensor, and accordingly, the menu mode, as well, is similar.

The invention claimed is:

1. An input and output apparatus for inputting and outputting data from a first electronic device, comprising:
    at least one storage unit storing data obtained by the first electronic device,
    wherein the apparatus is detachably mountable to the first electronic device and to at least one second electronic device such that the apparatus is held in place by one of the first electronic device and the at least one second electronic device on which the apparatus is detachably mounted,
    wherein the apparatus is adapted to copy the data obtained from the first electronic device to the at least one second electronic device,
    wherein the apparatus is detachably mountable on the at least one second electronic device in order to copy the data into the at least one second electronic device,
    wherein the data includes adjustment values for adjusting the second electronic device, and
    wherein the first electronic device and the at least one second electronic device each includes at least one of a pressure sensor, a filling level sensor, a limit level sensor, a flow sensor and a temperature sensor.

2. The apparatus according to claim 1, wherein the apparatus is detachably mountable to the first electronic device in at least two different positions, the apparatus further comprising:
    a first contacting arrangement which, independent of a selected position in a mounted state of the apparatus on the first electronic device, electrically contacting with a second contacting arrangement of the first electronic device.

3. The apparatus according to claim 2, wherein the first contacting arrangement includes first groups of contacting arrangement and second groups of contacting arrangement which are spaced apart from each other.

4. The apparatus according to claim 2, wherein the first contacting arrangement includes at least one electric contact surface.

5. The apparatus according to claim 2, wherein the second contacting arrangement includes at least one electric spring contact.

6. The apparatus according to claim 2, wherein the first contacting arrangement includes at least one electric spring contact.

7. The apparatus according to claim 2, wherein the second contacting arrangement includes at least one electric contact surface.

8. The apparatus according to claim 1, further comprising:
    a first attachment arrangement which, in a mounted state of the apparatus, detachable engaged with a second attachment arrangement of the first electronic device.

9. The apparatus according to claim 8, wherein the first attachment arrangement and the second attachment arrangement together form a bayonet joint.

10. An input and output apparatus for inputting and outputting data of at least two electronic devices and for transferring data between the at least two electronic devices, comprising:
    a storage unit storing the data,
    wherein the apparatus is detachably mountable on the at least two electronic devices such that the apparatus is held in place by one of the first electronic device and the at least one second electronic device on which the apparatus is detachably mounted,
    wherein the apparatus is adapted to copy the data obtained from a first one of the at least two electronic devices to a second one of the at least two electronic devices,
    wherein the apparatus is detachably mountable on the at least one second electronic device in order to copy the data into the at least one second electronic device,
    wherein the data includes adjustment values for adjusting the second electronic device, and
    wherein the at least two electronic devices each include at least one of a pressure sensor, a filling sensor, a limit level sensor, a flow sensor and a temperature sensor.

11. The apparatus according to claim 10, wherein the obtained data includes adjustment values for adjusting the at least two electronic devices.

12. An input and output apparatus for inputting and outputting data from a first electronic device, comprising:
    at least one storage unit storing data obtained by the first electronic device; and
    a first attachment arrangement which, in a mounted state of the apparatus, detachable engaged with a second attachment arrangement of the first electronic device;
    wherein the apparatus is detachably mountable to the first electronic device and to at least one second electronic device,
    wherein the first electronic device and the at least one second electronic device each includes at least one of a pressure sensor, a filling level sensor, a limit level sensor, a flow sensor and a temperature sensor,
    wherein the first attachment arrangement and the second attachment arrangement together form a bayonet joint, and
    wherein the first attachment arrangement includes at least one pivot, the second attachment arrangement including at least one pivot receiving recess into which a pivot is introduced by a combined axial and rotational movement.

13. The apparatus according to claim 12, wherein the at least one pivot receiving recess includes a blocking arrangement in order to prevent an unintentional detachment of the first and second attachment arrangements.

14. The apparatus according to claim 13, wherein the blocking arrangement is an elevation which is placed in the pivot receiving recess, the blocking arrangement being passed by the pivot with blocking of the first and second attachment arrangements.

15. An input and output apparatus for inputting and outputting data from a first electronic device, comprising:
- at least one storage unit storing data obtained by the first electronic device; and
- a first contacting arrangement which, independent of a selected position in a mounted state of the apparatus on the first electronic device, electrically contacting with a second contacting arrangement of the first electronic device;
- wherein the apparatus has an upper side and a lower side, the upper side facing a user, the apparatus further comprising at least one operating arrangement which is in connection with the first contacting arrangement, the first contacting arrangement being situated on the lower side and having contacting surfaces placed in a plurality of locations on the lower side,
- wherein the apparatus is detachably mountable to the first electronic device and to at least one second electronic device,
- wherein the first electronic device and the at least one second electronic device each includes at least one of a pressure sensor, a filling level sensor, a limit level sensor, a flow sensor and a temperature sensor,
- wherein the apparatus is detachably mountable to the first electronic device in at least two different positions, and
- wherein a connection of the second contacting arrangement is ensured in any position of attachment.

16. The apparatus according to claim 15, further comprising:
- a device body situated on the lower side as a reception ring.

17. The apparatus according to claim 15, further comprising:
- at least one operating key.

18. The apparatus according to claim 15, further comprises:
- at least one display arrangement.

19. The apparatus according to claim 18, wherein the display arrangement receives an electric current from the first electronic device via the first contacting arrangement, the display arrangement displaying data of the first electronic device.

20. An adjustment system, comprising:
- an input and output apparatus;
- a first electronic device; and
- at least one second electronic device,
- wherein the apparatus is detachably mountable on the first electronic device and on the at least one second electronic device in order to copy the data into the at least one second electronic device such that the apparatus is held in place by one of the first electronic device and the at least one second electronic device on which the apparatus is detachably mounted, the apparatus including at least one storage unit storing data obtained by the first electronic device, the at least one storage unit copying the data into the at least one second electronic device,
- wherein the data includes adjustment values for adjusting the second electronic device, and
- wherein the first electronic device and the at least one second electronic device each includes one of a pressure sensor, a filling sensor, a limit level sensor, a flow sensor and a temperature sensor.

21. The adjustment system according to claim 20, wherein at least one of the first electronic device and the at least one second electronic device includes at least one of a pressure sensor, a filling level sensor, a limit level sensor, a flow sensor and a temperature sensor.

22. An adjustment system, comprising:
- an input and output apparatus for inputting and outputting data and for transferring data between a first electronic device and at least one second electronic device,
- wherein the apparatus is detachably mountable on the first electronic device and on the at least one second electronic device in order to copy the data into the at least one second electronic device such that the apparatus is held in place by one of the first electronic device and the at least one second electronic device, the apparatus comprising at least one storage unit storing data from the first electronic device, the data being copied from the at least one storage unit into the second electronic device,
- wherein the data includes adjustment values for adjusting the second electronic device, and
- wherein the first electronic device and the at least one second electronic device each includes at least one of a pressure sensor, a filling level sensor, a limit level sensor, a flow sensor and a temperature sensor.

23. A method for transferring adjustment data between a first electronic device and at least one second electronic device, comprising the steps of:
- determining adjustment values for adjusting the first electronic device;
- storing the adjustment values in the first electronic device;
- copying the adjustment values in a storage unit of an input and output apparatus mounted on the first electronic device;
- taking off the apparatus from the first electronic device;
- mounting the apparatus on the at least one second electronic device; and
- copying the adjustment values for adjusting the at least one second electronic device into the second electronic device,
- wherein the first electronic device and the at least one second electronic device each includes at least one of a pressure sensor, a filling level sensor, a limit level sensor, a flow sensor, and a temperature sensor.

24. The method according to claim 23, wherein the adjustment values for adjusting the first electronic device are copied into the storage unit of the apparatus after inputting an operating instruction via the apparatus.

25. The method according to claim 23, wherein the adjustment values for adjusting the first electronic device are automatically copied to the storage unit of the apparatus after the adjustment process is complete.

26. The method according to claim 23, wherein the adjustment values for adjusting the second electronic device are copied into the second electronic device after inputting an operating instruction via the apparatus.

27. The method according to claim 23, wherein the adjustment values for adjusting the second electronic device are automatically copied to the storage unit of the apparatus as soon as the apparatus has been mounted on the second electronic device.

28. An operating and display module for operating a first electronic equipment and at least one second electronic equipment, the module being detachably mounted to and held in place by one of the first electronic equipment and the at least one second electronic equipment in at least two different positions in order to copy data into the at least second electronic equipment, wherein the data includes adjustment values for adjusting the at least one second electronic equipment, comprising:

at least one arrangement including at least one of an input device and an output device, wherein each of the input device and the output device includes at least one storage unit storing at least one of the data and adjustment values of the first electronic equipment, a first attachment arrangement detachably engaged in each selected mounting position to one of the first electronic equipment and the at least one second electronic equipment with a second attachment arrangement of the electronic equipment; and a first contacting arrangement contacting in a mounted state of the operating module on one of the first electronic equipment and the at least one second electronic equipment a second contacting arrangement of the electronic equipment so as to transmit electric signals to the electronic equipment corresponding to inputs/outputs signal.

29. The operating module according to claim 28, wherein the first attachment arrangement and the second attachment arrangement together form a bayonet joint.

30. The operating module according to claim 28, wherein the input device includes at least one of a press button, a switch, a touch screen, a key, a roll, a rocker switch and an joystick.

31. The operating module according to claim 28, wherein the first contacting arrangement includes several contacting surfaces placed at a plurality of locations.

32. The operating module according to claim 28, wherein the display arrangement includes at least one of an LCD display, an OLED display and a PLED display.

33. An operating and display module for operating an electronic equipment, the module being detachably mounted to the electronic equipment in at least two different positions, comprising:

at least one arrangement includes at least one of an input device and an output device, wherein each of the input device and the output device includes at least one storage unit storing at least one of the data and adjustment values of the first electronic equipment, a first attachment arrangement detachably engaged in each selected mounting position to the electronic equipment with a second attachment arrangement of the electronic equipment; and a first contacting arrangement contacting in a mounted state of the operating module on the electronic equipment a second contacting arrangement of the electronic equipment so as to transmit electric signals to the electronic equipment corresponding to inputs/outputs signal, wherein the operating module has a substantially cylindrical shape and fits into a cylindrical reception of the electronic equipment.

34. A combination of:

an input and output device for inputting data and for displaying information of an electronic equipment; and at least one electronic equipment, wherein the input and output device is detachably mounted to the electronic equipment in at least two different positions such that the input and output device is held in place by the electronic equipment and wherein the input and output device comprises a first contacting arrangement which, independent of a selected position in the mounted state of the input and output device on the electronic equipment, electrically coupled to a second contacting arrangement of the electronic equipment, and wherein the input device and the output device comprises at least one storage unit which at least one of (i) stores the data or adjustment values of the first electronic equipment and (ii) transferred to a second electronic equipment, wherein the input and output device is detachably mountable on the at least one second electronic equipment in order to copy the data into the at least one second electronic equipment, and wherein the data includes adjustment values for adjusting the second electronic device.

35. The combination according to claim 34, wherein the electronic equipment includes at least one of a pressure sensor, a filling level sensor, a limit value transmitter and a temperature sensor.

36. The combination according to claim 34, wherein the electronic equipment has a reception arrangement receiving the input and output device, and an attachment arrangement fixing the input and output device to the electronic equipment.

37. The combination according to claim 36, wherein the reception arrangement includes a first plug-in arrangement, and the input and output device includes second plug-in arrangement.

38. The combination according to claim 36, wherein the attachment arrangement is a separate cover member.

39. A combination of:

an input and output device for inputting data and for displaying information of an electronic equipment; and at least one electronic equipment, wherein the input and output device is being detachably mounted to the electronic equipment in at least two different positions and comprises a first contacting arrangement which, independent of a selected position in the mounted state of the input and output device on the electronic equipment, electrically coupled to a second contacting arrangement of the electronic equipment, wherein the input device and the output device comprises at least one storage unit which at least one of (i) stores the data or adjustment values of the first electronic equipment and (ii) transferred to a second electronic equipment, wherein the electronic equipment has a reception arrangement receiving the input and output device, and an attachment arrangement fixing the input and output device to the electronic equipment, wherein the attachment arrangement is a separate cover member, and wherein the cover member has an internal thread, and the electronic equipment has an external thread, the internal thread being screwed on the external thread.

* * * * *